UNITED STATES PATENT OFFICE.

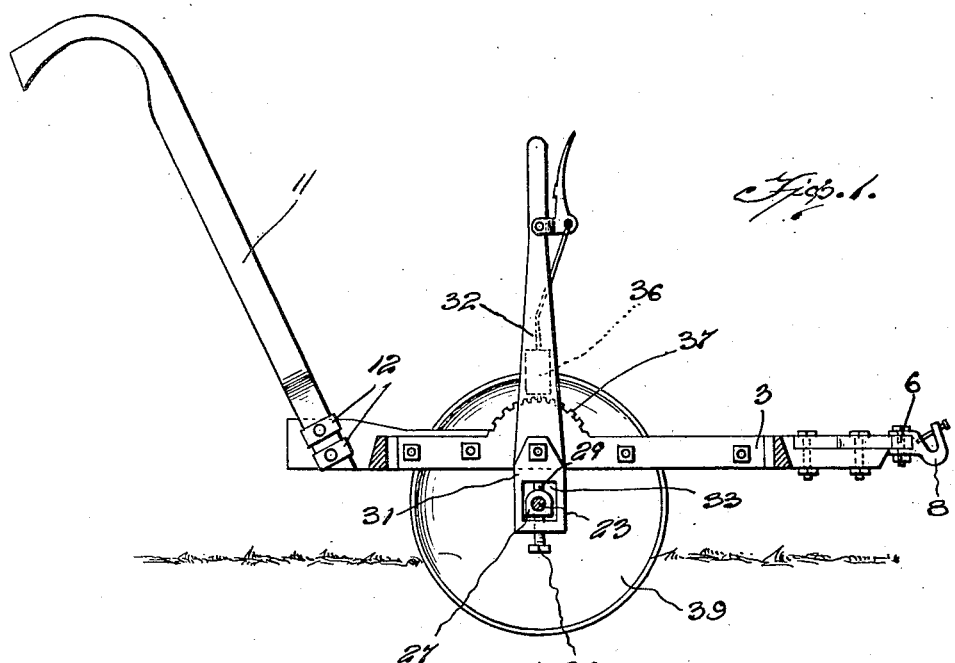
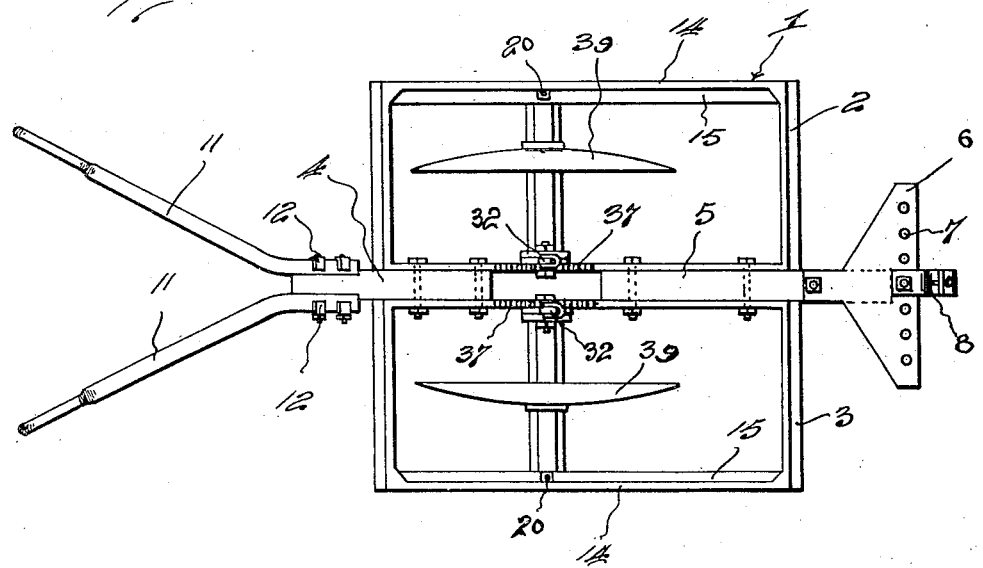

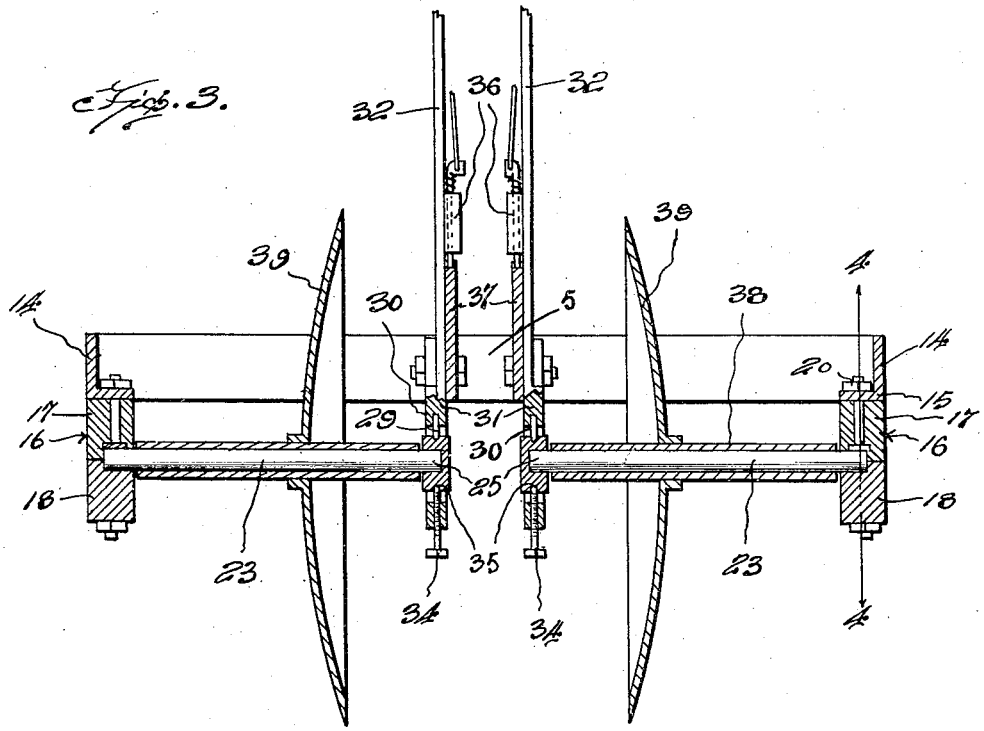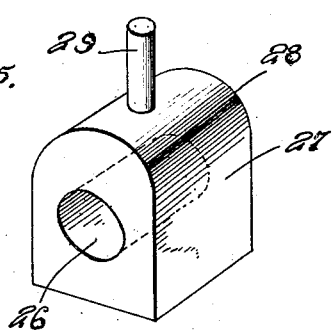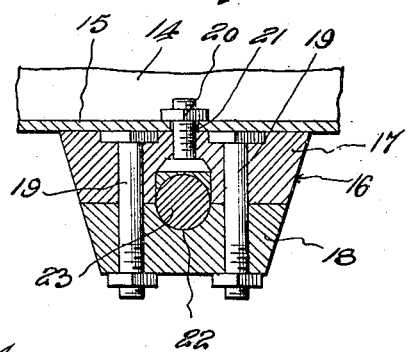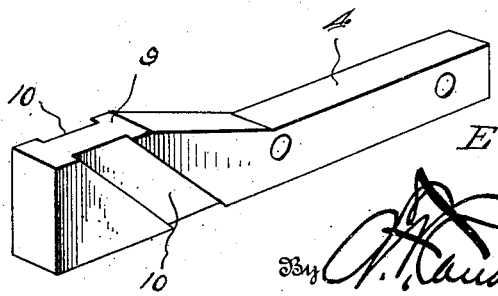

ENOCH E. PADGET AND WILLIAM O. CLARK, OF SEALE, ALABAMA.

CULTIVATOR.

1,245,613.  Specification of Letters Patent.  Patented Nov. 6, 1917.

Application filed January 19, 1916. Serial No. 73,018.

*To all whom it may concern:*

Be it known that we, ENOCH E. PADGET and WILLIAM O. CLARK, citizens of the United States, residing at Seale, in the county of Russell and State of Alabama, have invented certain new and useful Improvements in Cultivators; and we do hereby declare the following to be a full, clear, and exact description of the invention, such as will enable others skilled in the art to which it appertains to make and use the same.

This invention relates to cultivators, and the primary object of the invention is to provide a cultivator, which is extremely simple in construction and includes a supporting frame, which detachably supports a pair of cultivating element supporting shafts and pivotally supports a plurality of levers which are connected to said shaft for shifting the angle of the shaft with respect to the direction of travel of the cultivator, for varying the cut of the cultivating elements.

With the foregoing and other objects in view this invention consists in such novel features of construction, combination and arrangement of parts as will be hereinafter more fully described, illustrated in the accompanying drawings and claimed.

In describing the invention in detail reference will be had to the accompanying drawings wherein like characters designate like and corresponding parts throughout the several views, and in which:—

Figure 1 is a longitudinal section through the improved cultivator.

Fig. 2 is a top plan view of the cultivator.

Fig. 3 is a cross sectional view through the cultivator.

Fig. 4 is a section on the line 4—4 of Fig. 3.

Fig. 5 is a detail perspective of a block used in the cultivator construction, and Fig. 6 is a detail perspective of the handle supporting bar.

Referring more particularly to the drawings, 1 designates the rectangular supporting frame of the cultivator, which is composed of rectangular companion sections 2 and 3. The sections 2 and 3 have a handle supporting bar 4 and a tongue 5 positioned between their facing edges, and secured thereto as is clearly shown in Fig. 2 of the drawings.

The forward end of the tongue 5 has an enlarged head 6 formed thereupon, which is provided with a plurality of laterally spaced openings 7. A clevis 8 used for attaching a draft animal to the cultivator, is detachably connected to the head 6 and adjustably connected thereto, owing to the fact that it may be attached to the head by means of any one of the various openings 7.

The handle supporting bar 4 has an enlarged head 9 formed upon its rear end, which head is provided with a pair of downwardly and forwardly inclining recesses 10. The lower ends of handles 11 of ordinary construction are seated in the recesses 10 and secured to the handle bar 4 in any suitable manner such as by clips and bolts illustrated at 12.

The side rails 14 of the companion sections 2 and 3 of the rectangular frame 1 have horizontally positioned portions 15 to which are pivotally connected blocks 16. The blocks 16 are composed of a pair of sections 17 and 18 which are connected by means of bolts 19. The top or upper section 17 of the blocks 16 are connected to the horizontal portions 15 of the side rails 14, by bolts 20 which extend partially through the blocks and through openings 21 formed in the horizontal portions 15. The openings 21 are of sufficient size to permit of a pivoted movement of the blocks 16 about the bolts 20 as an axis. The blocks 16 are provided with centrally disposed bearing openings 22 in which the ends of shafts 23 are mounted.

The inner terminal ends 25 of the shafts 23 are seated in recesses 26 which are formed in blocks 27. The blocks 27 have their under surfaces or bottoms straight and their upper surfaces curved as is clearly shown in Fig. 5 of the drawings. The blocks 27 have vertically extending pins 29 secured centrally to their upper surfaces and extending upwardly therefrom, which pins project into recesses 30 formed in the enlarged ends 31 of levers 32 and 33.

The enlarged heads 31 of the levers 32 have rectangularly shaped openings 33 formed therein in which the blocks 27 are seated. Set screws 34 are adjustably carried by the lower portions of the heads 31 and they have their upper ends seated in recesses 35, which are formed in the under surfaces of the blocks 27. The levers 32 have dog mechanisms 36, of the ordinary construction, carried thereby which coact with quadrants 37, for holding the levers in various adjusted positions.

The shafts 23 have sleeves 38 mounted thereupon, upon which sleeve cultivating disks 39 are mounted.

When it is desired to adjust the angles of the disks 39 with respect to the direction of travel of the cultivator the set screws 34 are loosened or moved downwardly which allows the blocks 27 to move vertically within the openings 33, after which the levers 32 are moved in an oscillatory manner which will move the inner ends of the shafts 23, either forwardly or rearwardly, depending upon the direction in which the levers are moved and will swing the outer ends of the shafts, and the bearing boxes 16, about their pivotal axis, and angle the disks with relation to the line of travel of the cultivator. After the shafts have been moved to the desired angles, the set screws 34 are tightened for preventing accidental vertical movement of the blocks 27 in the openings 33. The vertical movement of the blocks 27 compensates for the arcuate movement of the lower ends of the levers 32.

In reducing the invention to practice certain minor features of construction, combination and arrangement of parts may necessitate alterations to which the patentees are entitled provided such alterations are comprehended within the scope of what is claimed.

What is claimed is:—

1. In a cultivator structure, a supporting frame, a bearing box pivotally carried by said supporting frame for pivotal movement in a horizontal plane, a shaft having one end journaled in said bearing box, a hand lever pivotally carried by said supporting frame and having its lower end enlarged, the lower enlarged end of said lever provided with an opening, a bearing block seated in said opening, said shaft having one end rotatably seated in said bearing block, said bearing block adapted for vertical movement within said opening to compensate for the arcuate movement of the lower end of said hand lever upon pivotal movement of the hand lever for varying the angle of said shaft with respect to the direction of travel of the supporting frame.

2. In a cultivator structure, a supporting frame, a bearing box pivotally carried by said supporting frame for pivotal movement in a horizontal plane, an implement carrying shaft having one end journaled in said bearing box, a hand lever pivotally carried by said supporting frame and having its lower end enlarged, the lower enlarged end of said lever provided with an opening, a bearing block seated in said opening, said shaft having one end rotatably seated in said bearing block, said bearing block adapted for vertical movement within said opening to compensate for the arcuate movement of the lower end of said hand lever upon pivotal movement of the hand lever for varying the angle of said shaft with respect to the direction of travel of the supporting frame, means for guiding the vertical movement of said block within said opening, and means for preventing accidental vertical movement of said block within said opening.

In testimony whereof we affix our signatures in presence of two witnesses.

ENOCH E. PADGET.
WILLIAM O. CLARK.

Witnesses:
 EULA FAIRCLOTH,
 B. P. FAIRCLOTH.